United States Patent [19]

Galaj

[11] Patent Number: 4,708,801
[45] Date of Patent: Nov. 24, 1987

[54] METHOD AND DEVICE FOR FILTERING A SUSPENSION OF PARTICLES IN A LIQUID

[75] Inventor: Stanislas Galaj, Arcueil, France

[73] Assignee: Compagnie Generale d'Electricite, Paris, France

[21] Appl. No.: 851,750

[22] Filed: Apr. 14, 1986

[30] Foreign Application Priority Data

Apr. 12, 1985 [FR] France ............................. 85 05544

[51] Int. Cl.$^4$ ..................... B01D 13/00; B01D 29/38; B01D 33/06
[52] U.S. Cl. .................................. 210/636; 210/393; 210/412; 210/416.1; 210/472; 210/512.3; 210/780; 210/787; 210/791
[58] Field of Search ............... 210/636, 411, 416, 412, 210/472, 483, 391, 393, 360.1, 780, 257.2, 359, 512.1, 512.3, 787, 791; 415/71, 73

[56] References Cited

U.S. PATENT DOCUMENTS

| | | | |
|---|---|---|---|
| 863,250 | 8/1907 | Abbé | 415/71 |
| 3,098,602 | 7/1963 | Torluemke | 415/73 |
| 3,355,382 | 11/1963 | Huntington | 210/637 |
| 3,735,199 | 5/1973 | Ascoli | 239/708 |
| 3,809,491 | 5/1974 | Banyai | 415/73 |
| 3,997,447 | 12/1976 | Breton et al. | 210/412 |
| 4,298,358 | 11/1981 | Ruschke | 210/436 X |
| 4,647,376 | 3/1987 | Galaj | 210/360.1 |

FOREIGN PATENT DOCUMENTS 666744 7/1965 Belgium .
528019 10/1972 Switzerland .

Primary Examiner—Richard V. Fisher
Assistant Examiner—W. Gary Jones
Attorney, Agent, or Firm—Sughrue, Mion, Zinn, Macpeak, and Seas

[57] ABSTRACT

In a method and device for filtering a suspension of particles in a liquid the liquid is passed continuously through a porous membrane, particles from the suspenion gradually accumulating on the membrane and clogging its pores. The filtered liquid is caused to flow momentarily in the reverse direction to return the accumulated particles to the suspension and so unclog the membrane. To achieve this the filtered liquid is fed into one end of a conduit wound around an axis and recovered from its other end, and the conduit is rotated about its axis, the speed of rotation gradually increasing, and then suddenly stopped.

12 Claims, 11 Drawing Figures

METHOD AND DEVICE FOR FILTERING A SUSPENSION OF PARTICLES IN A LIQUID

BACKGROUND OF THE INVENTION

1. Field of the Invention

The present invention concerns a method for filtering a suspension of particles in a liquid and a device for implementing this method.

2. Description of the prior art

The method is of the type in which:

the liquid of the suspension disposed on a first side of a porous membrane is passed continuously through the membrane so as to obtain a flow of filtered liquid on the second side of the membrane, particles from the suspension then collecting in an undesirable manner on the first side of the membrane and clogging its pores, and the filtered liquid is caused to flow at least momentarily in the opposite direction to the aforementioned flow towards the membrane so as to return to the suspension the particles collected on the first side of the membrane during the aforementioned passage of the liquid therethrough.

The device is of the type comprising:

a porous membrane the pores of which are adapted to hold back the particles, the suspension being disposed on and in contact with a first side of the membrane, means for passing the liquid of the suspension through the membrane from the first side of the second side so as to obtain a flow of filtered liquid on the second side of the membrane, particles then collecting in an undesirable manner on the first side of the membrane and clogging its pores, and means for exerting on the second side of the membrane a momentary pressure such as to cause the filtered liquid to flow in the opposite direction to the flow so as to return to the suspension the particles collected on the first side of the membrane A method and a device of the types indicated hereinabove are described in French patent application No. 2.513.536. In this patent application the system for causing the reverse flow of the filtered liquid comprises a piston movable within a cylinder communicating with the filtered liquid that has passed through the membrane and means for controlling the movement of the piston.

This device has a disadvantage. The reverse flow system requires an obstacle to the flow of the filtered liquid, such as a valve, so as to interrupt the flow of the liquid during the reverse flow. This reduces the reliability of the device.

A specific object of the present invention is to alleviate this disadvantage.

SUMMARY OF THE INVENTION

In one aspect the invention consists in a method for filtering a suspension of particles in a liquid, in which method:

the liquid of the suspension disposed on a first side of a porous membrane is passed continuously through the membrane so as to obtain a flow of filtered liquid on the second side of the membrane, particles from the suspension then collecting in an undesirable manner on the first side of the membrane and clogging its pores, and the filtered liquid is caused to flow at least once and momentarily towards the membrane in the opposite direction to the aforementioned flow so as to return to the suspension the particles collected on the first side of the membrane during the aforementioned passage of the liquid therethrough, and in which method the temporary return flow of the liquid is obtained:

by feeding the flow of filtered liquid into one end of a conduit which is wound around an axis and recovering the filtered liquid at the other end of the conduit, by progressively rotating the conduit about the axis in the direction opposite to the direction of flow of the filtered liquid relative to the conduit until the rotation speed of the conduit attains a predetermined constant value greater than the speed of the filtered liquid relative to the conduit, and by suddenly stopping rotation of the conduit.

In another aspect the invention consists in a device for filtering a suspension of particles in a liquid, said device comprising:

a porous membrane the pores of which are adapted to hold back the particles, the suspension being disposed on and in contact with a first side of the membrane, means for passing the liquid of the suspension through the membrane from the first side to the second side so as to obtain a flow of filtered liquid on the second side of the membrane, particles then collecting in an undesirable manner on the first side of the membrane and clogging its pores, means for exerting on the second side of the membrane a momentary pressure such as to cause the filtered liquid to flow in the opposite direction to the aforementioned flow so as to return to the suspension the particles collected on the first side of the membrane, a conduit wound around an axis, means for feeding the flow of filtered liquid into a first end of the conduit situated near the axis so as to cause the liquid to flow relative to the conduit towards its second end in one direction about the axis, means for progressively rotating the conduit about the axis in the direction opposite to that of the relative flow until the speed of rotation reaches a predetermined constant value greater that the speed of the relative flow, and means for suddenly stopping rotation of the conduit.

In a first embodiment of the device in accordance with the invention the conduit is in the shape of a spiral substantially disposed on a plane circular surface perpendicular to and centered on the axis.

In a first variant of this embodiment, the inner end of the spiral is situated in the vicinity of the centre of the circular surface to form the second end of the conduit and the outer end of the spiral is brought back towards the axis to constitute the first end of the conduit.

In a second variant, the second end of the conduit is situated at the perimeter of the circular surface so as to provide for ejection of the filtered liquid from this second end during rotation of the conduit, the means for passing the liquid of the suspension through the membrane utilizing the suction force generated by this ejection. In this second variant the conduit may comprise in the vicinity of its second end a portion along which the minimum distance from this portion to the axis decreases on approaching the second end, the decrease in this distance over the entire length of this portion being greater than the inside transverse dimension of the portion of the conduit as measured along a radius of the spiral.

When a portable device of the same kind as this second variant is required, advantageously:

the membrane is in the shape of a cylindrical tubular body of revolution closed at a first end, the membrane being fixed to the conduit by the second end of the tube, the axis of which is vertical and coincident with the axis of rotation of the conduit, the device further comprises:

a tubular macroporous body the outside surface of which is placed against the inside surface of the membrane, and a cylindrical core fastened to the conduit and disposed along the axis inside the macroporous tubular body so as to leave between the surface of the core and the inside surface of the macroporous body a tubular capillary space communicating with the first end of the conduit, the outside surface of the membrane constituting the first side thereof in contact with the suspension, the conduit is a capillary conduit at least at its two ends, the means for passing the liquid of the suspension from the first side to the second side of the membrane utilize the capillary forces in the pores of the membrane, in the macroporous body and in the capillary tubular space.

The conduit may then be a capilary conduit over all of its length. It may instead comprise between two capillary end parts a middle part whose inside transverse dimension is sufficiently large for the capillary forces in the liquid to be negligible there, a capillary first end part of the conduit bringing the outer end of the spiral back towards the axis so as to form the first end of the conduit and the capillary second end part of the conduit bringing the inner end of the spiral towards the perimeter of the circular surface so as to form the second end of the conduit.

In the second variant, the device may further comprise a fixed container surrounding the conduit, filled with filtered liquid and comprising an opening in its upper part to enable the filtered liquid to be collected.

The portable device may further comprise a container surrounding and fixed to the conduit, the upper part of the conduit wall being fitted with a porous membrane which is fluid-tight relative to the liquid of the suspension but permeable to air, the container comprising openings to enable the filtered liquid to be collected.

In a second embodiment of the device in accordance with the invention the conduit is in the shape of a helix desposed on a cylindrical surface of revolution about the axis, the two ends of the helix being brought back towards the axis to form the first and second ends of the conduit.

Specific embodiments of the present invention will now be described by way of non-limiting example only and with reference to the accompanying drawings.

DESCRIPTION OF THE PREFERRED EMBODIMENTS

Figure 1:
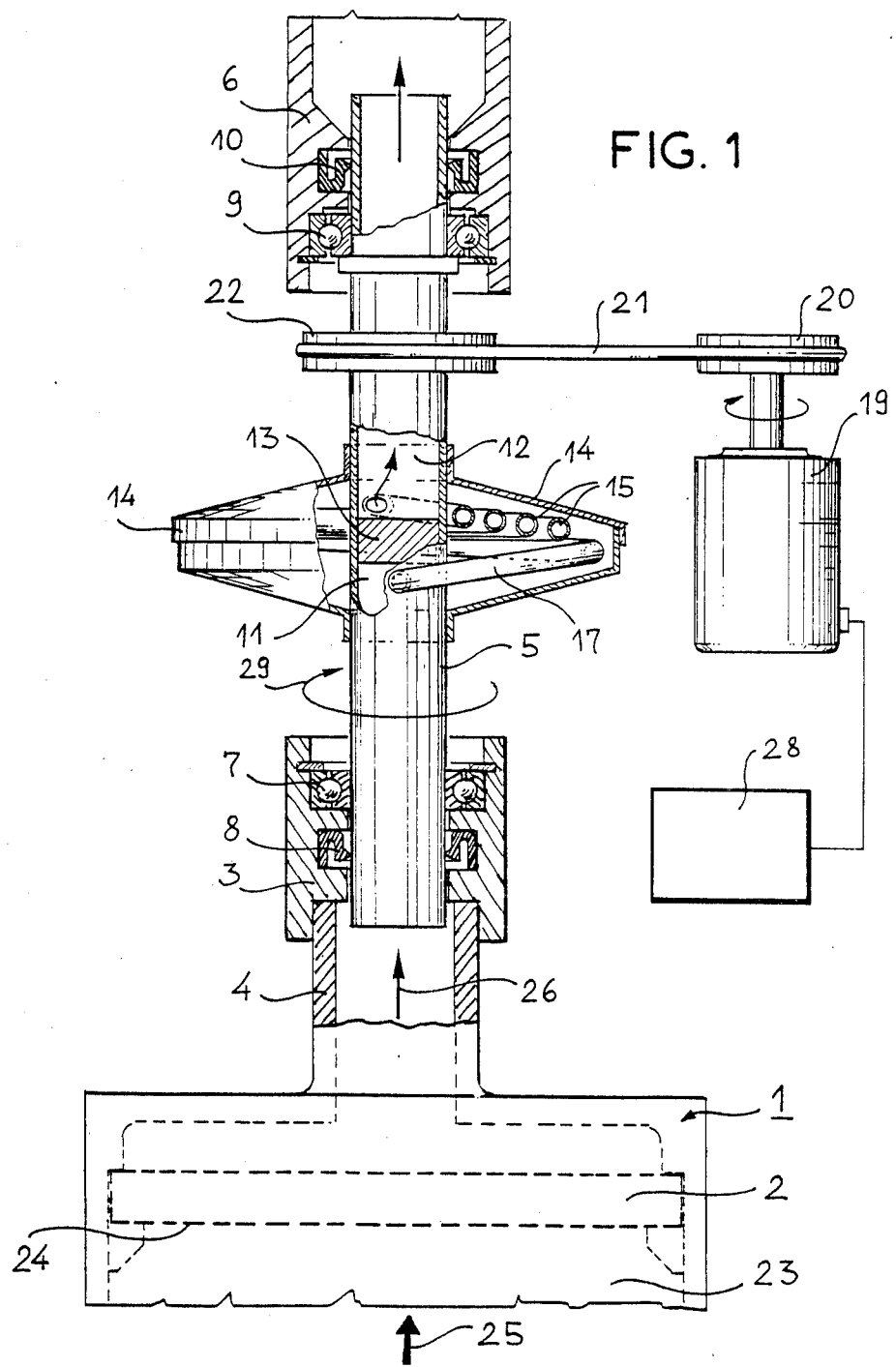
FIG. 1 shows in elevation and partial cross-section a first embodiment of the device in accordance with the invention.

FIG. 1 shows part of a generally cylindrical vertical filter unit 1. Inside the unit 1 there is a horizontal porous membrane 2 the edges of which bear on the inside cylindrical side wall of the filter unit which has on its upper surface a vertical tubular outlet 4. A vertical hollow shaft 5 rotates about the axis of the outlet 4 in two sleeve bearings 3 and 6. The bearing 3 fixed to the upper part of the outlet 4 surrounds the lower end of the shaft 5 via a ball bearing 7 and a lip seal 8 is disposed between the outlet 4 and the bearing 7. The bearing 6 surrounds the upper end of the shaft 5 via a ball bearing 9 and a lip seal 10 is disposed between the bearing 9 and the upper end of the shaft 5.

The cylindrical cavity within the hollow shaft 5 is divided into two parts 11 and 12 by a middle partition 13. A jacket 14 containing a spiral conduit 15 shown in detail in FIGS. 2 and 3 is attached to a middle part of the shaft 5.

The spiral conduit 15 is wound around the shaft 5 in a substantially horizontal plane. The end of the conduit 15 situated on the inside of the spiral discharges into the upper part 12 of the cavity in the shaft 5 through an opening 16 in the cylindrical wall of the shaft 5 just above the partition 13. The conduit 15 has an extension 17 bringing the outside end of the spiral back towards the shaft 5. This extension 17 discharges into the lower part 11 of the cavity in the shaft 5 through an opening 18 in the cylindrical wall of the shaft 5 just below the partition 13.

A pulley 20 fixed to the shaft of an electric motor 19 is coupled by a belt 21 to a pulley 22 fixed to the shaft 5.

Figure 2:
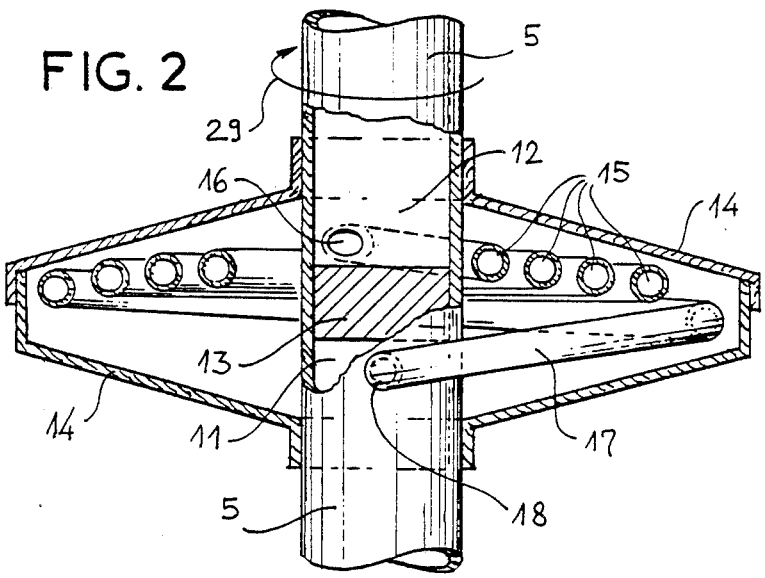
FIG. 2 is a view to a larger scale of the spiral conduit forming part of the device shown in FIG. 1.
Figure 3:
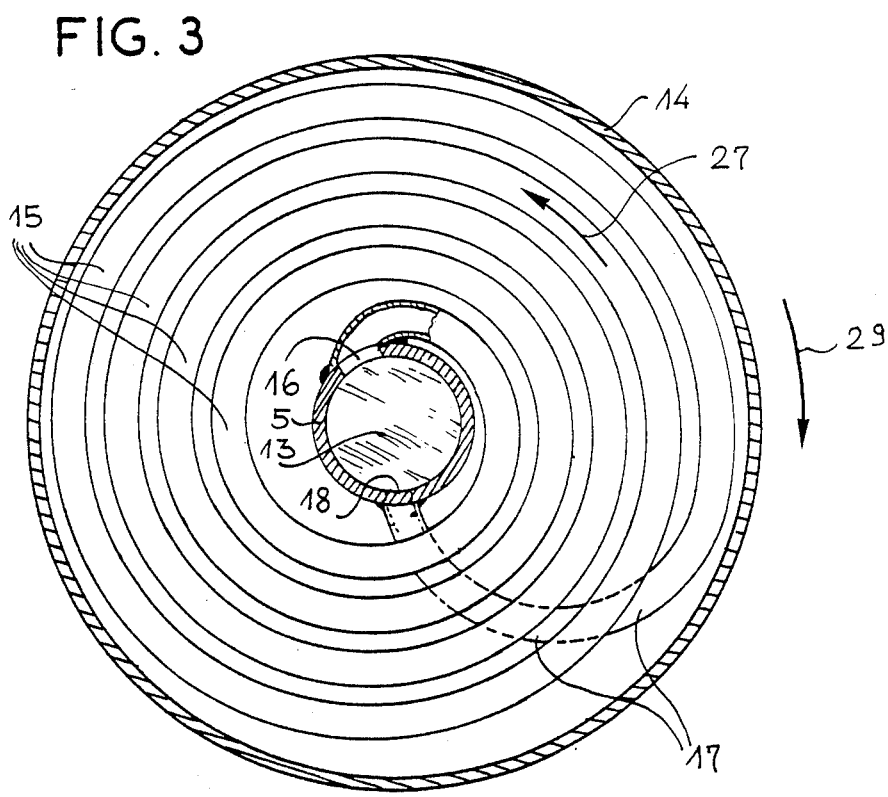
FIG. 3 is a plan view of the conduit shown in FIG. 1.

This is how the device shown in FIGS. 1 through 3 works.

A suspension of particles in a liquid to be filtered is placed in the interior 23 of the filter unit 1, below the membrane 2, so that the suspension is in contact with the lower surface 24 of the membrane. Pressure in the direction 25 towards the membrane 2 is then exerted on the suspension, by means of a piston that is not shown, for example. The pores in the membrane 2 are smaller than the particles to be filtered out. The liquid phase of the suspension passes through the membrane 2 to produce a flow 26 of filtered liquid that leaves the unit 1 via the opening 4. The filtered liquid enters the part 11 of the cavity in the shaft 5, the bearing 7 being protected against any ingress of liquid by the seal 8. The filtered liquid then enters the spiral conduit 15 through the opening 18 and leaves it through the opening 16 to flow into the upper part 12 of the shaft 5. The filtered liquid flows at a speed v relative to the conduit in the direction of the arrow 27 that can be seen in FIG. 3. The filtered liquid may be recovered at the upper end of the shaft 5 by any appropriate means (not shown).

After some time, however, it is seen that particles from the suspension collect on the lower surface 24 of the membrane, partially clogging the pores in the membrane, the degree of clogging gradually increasing.

This is how the membrane is unclogged.

The motor 19 is started by means of a power supply circuit 28 so as to rotate the shaft 5 about its axis at very low speed and in the direction 29 opposite that in which the filtered liquid 27 flows relative to the spiral conduit 15.

By means of the circuit 28 the speed of rotation is gradually increased until it reaches a predetermined absolute value V, still in the direction 29, significantly greater than the speed v at which the liquid flows in the conduit when V=0. Rotation of the conduit must be started slowly and gradually so that movement of the conduit relative to the liquid does not generate too high a suction force on the downstream side of the membrane, as this, added to the pressure force 25 on the upstream side of the membrane, could result in it becoming clogged more quickly.

When the conduit is rotating at the speed V the mass of liquid contained in it is caused to move in the direction the shaft is rotating and at the speed $V-v$.

The rotation speed of the motor 19 is then suddenly reduced, by means of a brake system, for example. The column of liquid in the conduit tends to continue to move at the speed $V-v$, because of its inertia.

The direction in which the liquid flows relative to the conduit is thus suddenly reversed: the result is a momentary pressure on the filtered liquid in the direction towards the membrane, the direction opposite that in which the liquid flows normally when being filtered. The peak value of this momentary pressure is proportional to the length of the column of liquid contained in the conduit, the value $V-v$ of the speed before braking and the magnitude of the deceleration produced by the braking.

To give an example, for filtering water, with a 10 square centimeter spiral conduit 10 meters long, a speed v of 1 meter per second and a speed V of 16 meters per second, it is possible to achieve an effect equivalent to a reverse pressure of approximately 1.5 bars if it takes 1 second to stop the motor or approximately 15 bars if this takes 0.1 second.

This momentary reverse pressure "unsticks" the layer of particles that has collected on the side 24 of the membrane 2. The particles return to the suspension, so unclogging the membrane.

Figure 4:
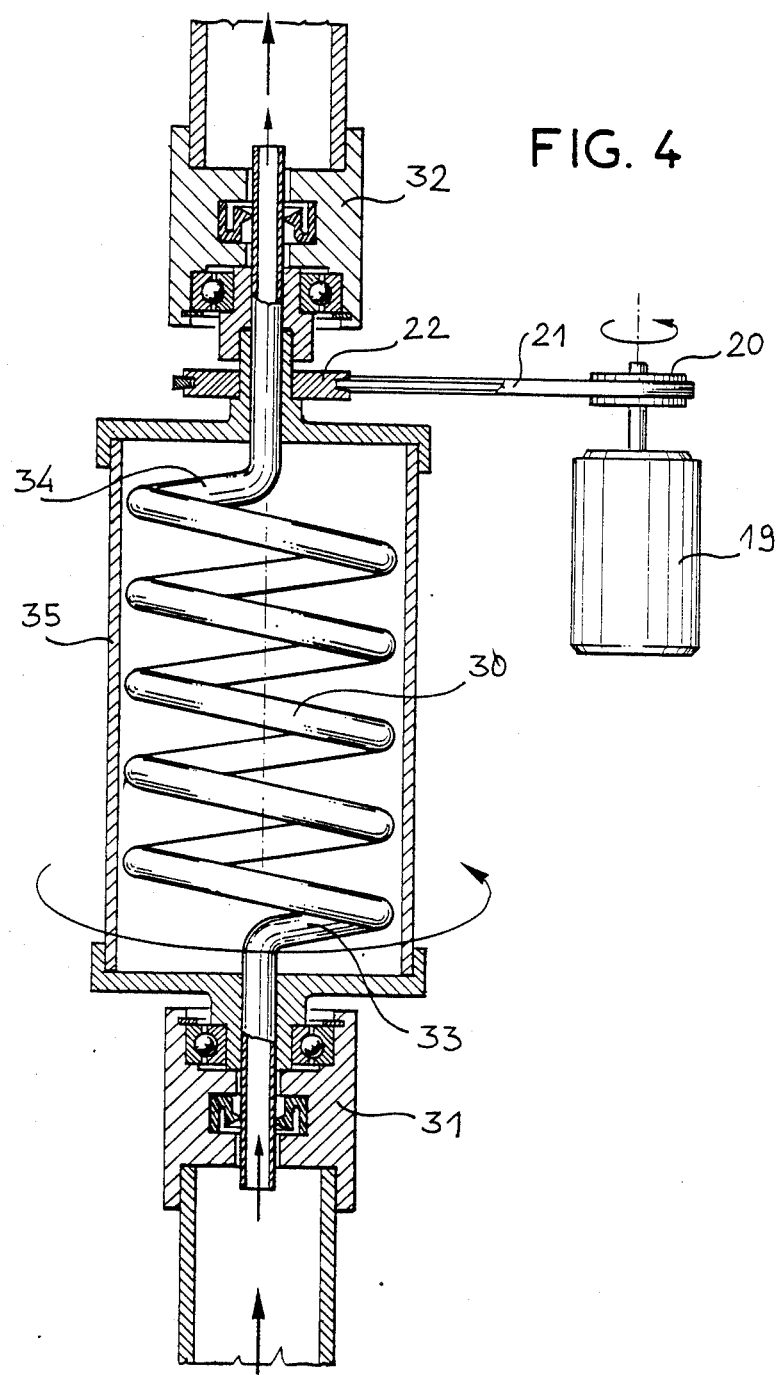
FIG. 4 shows in elevation and partial cross-section a second embodiment of the device in accordance with the invention.

The device shown in FIG. 4 is similar to that shown in FIG. 1. The conduit 30 is in the shape of a helix, however, disposed on a cylindrical surface of revolution about the rotation axis. This helix is fixed into a cylindrical jacket 35, for example, rotated by a motor 19 the shaft of which carries a pulley 20 coupled by a belt 21 to a pulley 22 fixed to the jacket 35. The jacket 35 rotates about a vertical axis in two bearings 31 and 32. The conduit 30 has two extensions 33, 34 which bring respective ends of the helix back towards the rotation axis, the extension 33 communicating with the outlet from the membrane of the filter unit (not shown) and the extension 34 discharging into a pipe leading to the filtered liquid outlet of the device.

The device shown in FIG. 4 naturally operates in just the same way as the device shown in FIG. 1.

Figure 5:
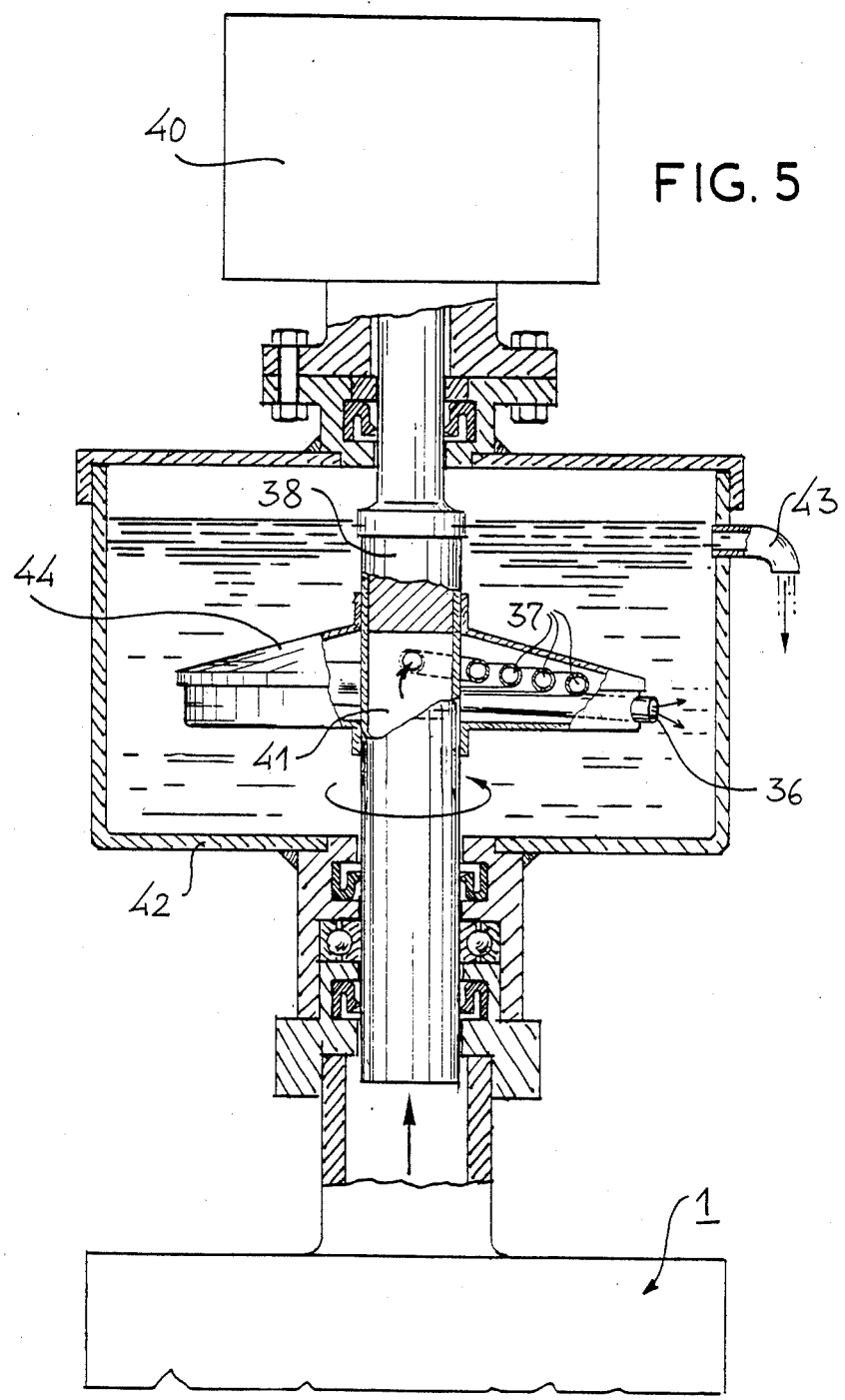
FIG. 5 shows in elevation and partial cross-section a third embodiment of the device in accordance with the invention.
Figure 6:
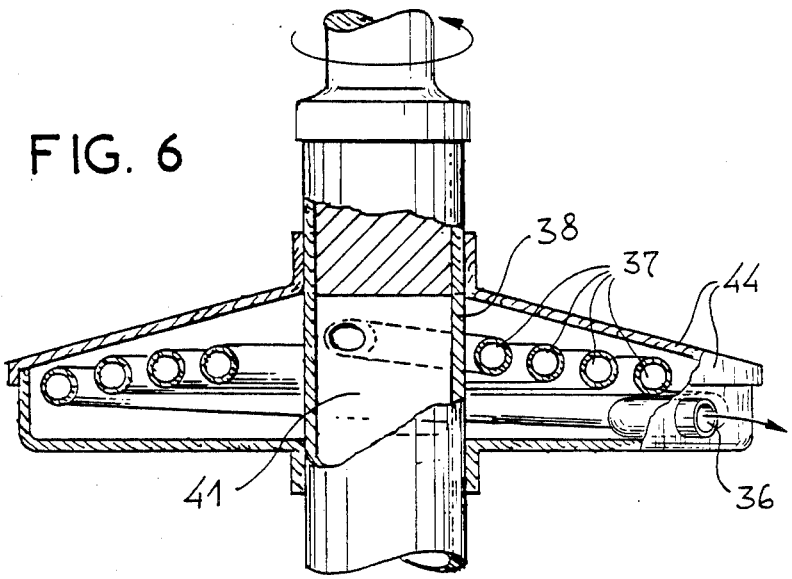
FIG. 6 shows in elevation and to a larger scale the spiral conduit of the device shown in FIG. 5.
Figure 7:
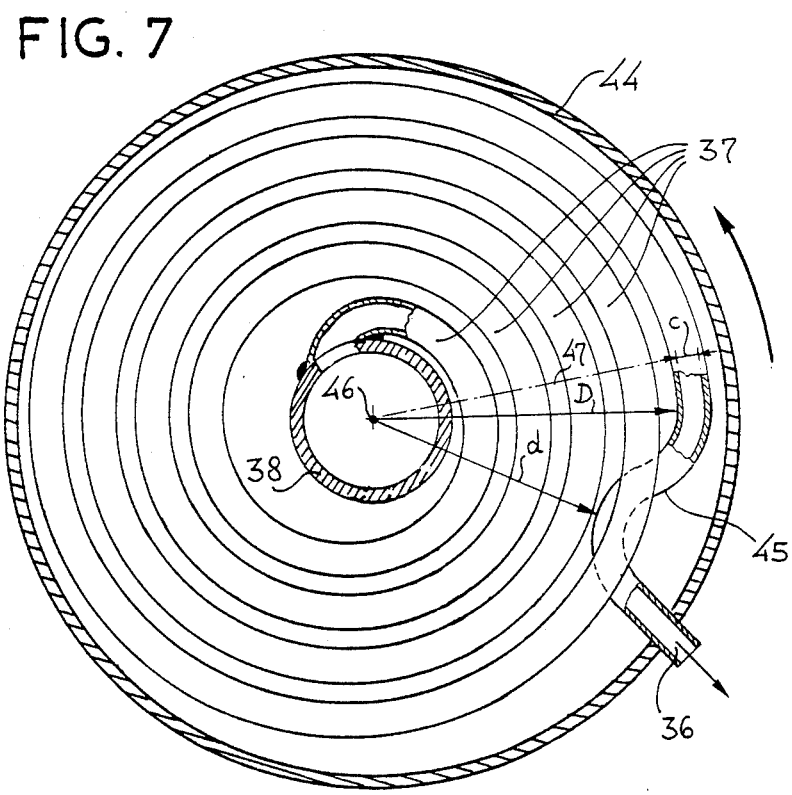
FIG. 7 is a plan view of the spiral conduit shown in FIG. 6.

The device shown in FIGS. 5 through 7 is a variant of the device shown in FIG. 1 in which the outside end 36 of the spiral conduit 37 is situated at the outer end of the spiral. This means that the filtered liquid can be ejected from the end 36 when the conduit is rotated by virtue of the resulting centrifugal force. This creates suction on the downstream side of the membrane of the filter unit 1. This means that it is no longer necessary to apply any pressure (25 in FIG. 1) to the suspension to get the liquid phase thereof to pass through the membrane.

The shaft 38 carrying the conduit 37 is then advantageously driven directly by a motor 40.

It is of course necessary to start (that is, prime) ejection of the filtered liquid before rotation of the shaft 38 is begun, by filling the conduit 37 and the cavity 41 in the shaft 38 with the filtered liquid, up to the level of the membrane of the filter unit 1.

The momentary reverse pressure is achieved by gradually accelerating the shaft 38 up to the speed V and then suddenly stopping it. This may cause loss of the priming that enabled ejection of the filtered liquid to take place.

To avoid this problem a fixed container 42 is placed around the conduit 37. The motor 40 may be attached to the container 42, as shown. In the upper part of the container is an opening 43 higher than the outlet 36 from the conduit 37. The container 42 is filled with filtered liquid, between its inside wall and the jacket 44 of the conduit 37, to a level above that of the outlet 36 from the conduit 37.

As the conduit 37 rotates the filtered liquid is ejected from its outlet 36. The ejected liquid raises the level of the liquid in the container 42, the filtered liquid flowing out through the opening 43 as soon as the level of the liquid in the container is high enough.

This arrangement prevents air entering the conduit 37 when rotation of the conduit is suddenly stopped in order to unclog the membrane of the filter unit, preventing the device from becoming unprimed.

To further reduce this risk, the conduit 37 comprises near its end 36 a portion 45 curving towards the axis of rotation 46 of the conduit. The minimum distance from this portion 45 to the axis 46 decreases over all of the length of the portion 45 and towards the end 36 from a value "D" to a value "d". The decrease "D−d" must be greater than the transverse inside dimension "c" of the portion 45 as measured along a radius 47 of the spiral. Downstream of the portion 45 the conduit can then curve outwards again so as to terminate substantially radially at the end 36. The resulting siphon effect prevents the device becoming unprimed when the conduit is rotating.

Figure 8:
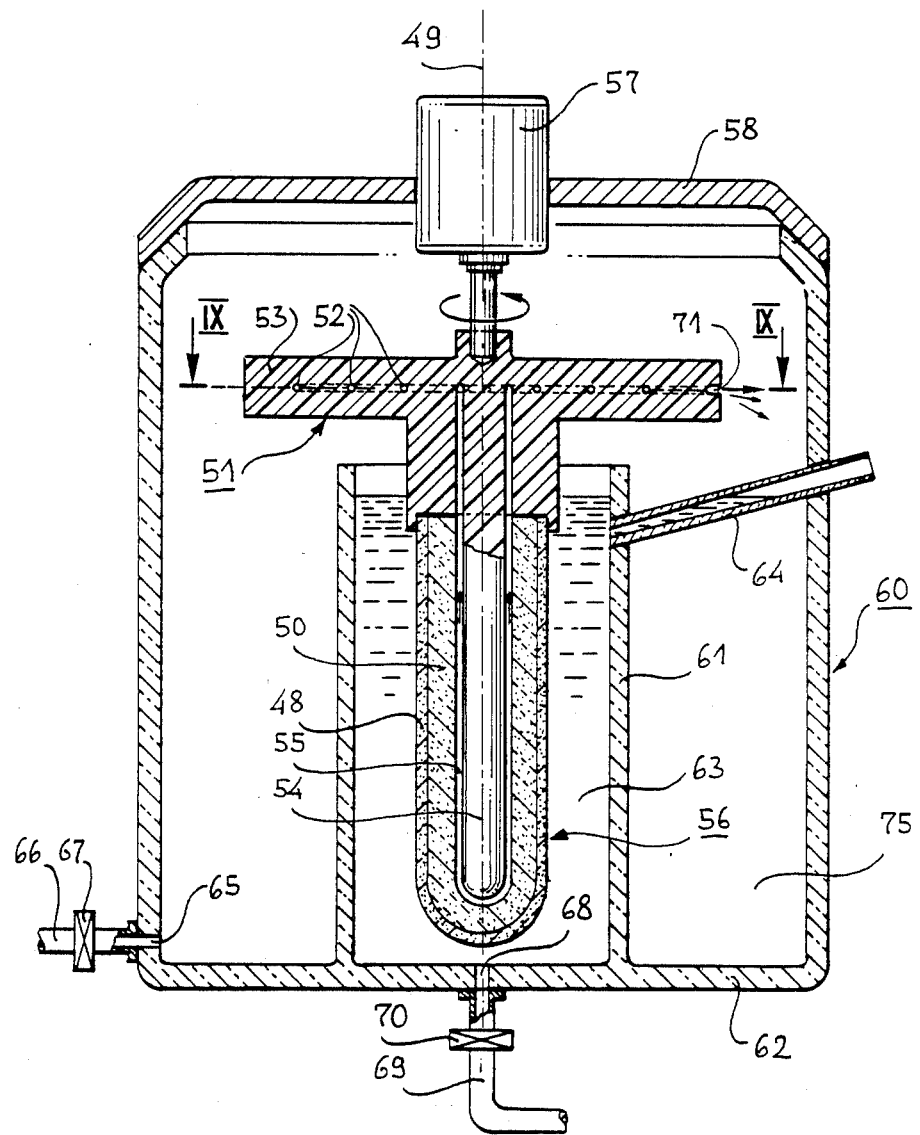
FIG. 8 shows in elevation and cross-section a fourth embodiment of the device in accordance with the invention.

The device shown in FIG. 8 is particularly suited to compact portable devices. It comprises a microporous membrane 48 in the shape of a tubular body of rotation closed at one end.

The membrane is disposed vertically with its axis 49 coincident with the rotation axis of the conduit so that the closed end of the tube is situated in the bottom part of the membrane. The outside surface of a tubular macroporous body 50 is placed against the inside surface of the membrane. The membrane 48 and the macroporous body 50 are advantageously in one piece 56 made of ceramic. The pores in the membrane 48 are adapted to block the particles in the suspension to be filtered.

The upper end of the ceramic part is fixed to a part 51, which may be of plastics material, for example, in the shape of a cylinder of revolution about the axis 49.

The part 51 includes a circular horizontal plate 53 in which are disposed the turns of a spiral conduit 52. The part 51 also comprises an axial cylindrical core 54. Between the surface of the core 54 and the inside surface of the macroporous body 50 is a cylindrical capillary space 55 communicating with the inner inlet of the conduit 52. The filter assembly consisting of the parts 51 and 56 may be rotated about the axis 49 directly by a motor 57. The casing of the motor 57 is fixed into a cover 58 of a container 60 surrounding the filter assembly. This container has a fixed partition 61 fixed to its bottom 62 so as to form a cylindrical inner chamber 63 open at the top. The chamber 63 is filled with liquid to be filtered in which the membrane 48 of the part 56 is immersed. A feed trough 64 passing through the wall of the container 60 is used to feed liquid to be filtered into the chamber 63. A hole 65 in the bottom of the container 60 communicates with a take-off pipe 66 fitted with a valve 67. A hole 68 in the bottom of the chamber 63 communicates with a drain pipe 69 fitted with a valve 70.

Figure 9:
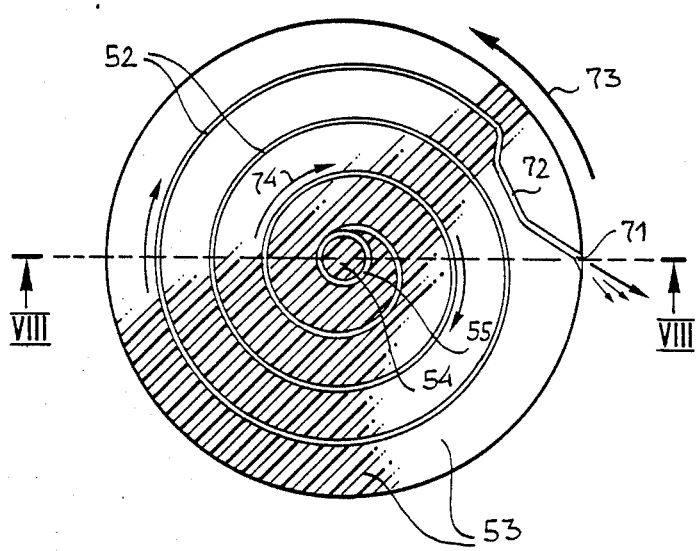
FIG. 9 is a view of the conduit of the device shown in FIG. 8 in cross-section on the line IX—IX, the section plane being only partially shaded with a view to making the diagram clearer.

FIG. 9 shows the shape of the spiral conduit 52 fitted near its outer end 71 with a siphon system analogous to the one shown in FIG. 7. The conduit 52 is a capillary conduit over all of its length.

This is how the device shown in FIGS. 8 and 9 works.

After starting up the motor 57 in the direction 73, the suspension to be filtered is fed into the chamber 63. By virtue of capillary action the liquid phase of the suspension is drawn through the pores of the membrane 48 and fills the pores of the macroporous body 50, the capillary space 55 and the capillary conduit 52, while the particles of the suspension remain in the chamber 63 on the outside of the membrane 48.

Centrifugal force due to the rotation of the conduit causes the liquid in the conduit to flow in the direction 74 opposite the direction 73 and to be ejected from the end 71 of the conduit. The ejected liquid phase flows to the bottom of the chamber 75 outside the container 60.

If particles accumulate on the outside of the membrane rotation of the motor 57 is suddenly stopped so as to exert on the membrane a reverse pressure tending to detach the accumulated particles from the membrane as already described in connection with the preceding examples. Apart from its compactness this embodiment offers the advantage that it dispenses with the rotary seals needed in the case of FIGS. 1, 4 and 5.

Figure 10:
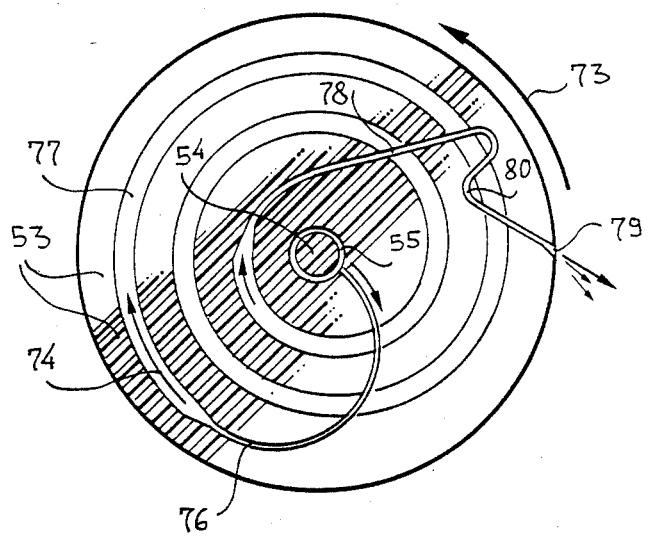
FIG. 10 is a view in plan and cross-section of an embodiment of conduit that could be used in the device shown in FIG. 8.

FIG. 10 shows a variant spiral conduit that can be adapted to suit the devices of the type shown in FIG. 8. It has a capillary first part 76 coupling the upper end of the capillary space 55 to the outer end of the spiral. The part 76 is coupled to an intermediate part 77 corresponding to the spiral proper. This part 77 may have a larger inside transverse dimension and need not be a capillary conduit. The part 77 is connected at the inner end of the spiral to a capillary end part 78 leading at the perimeter of the disk 53 to the eject end 79 of the conduit via a siphon system similar to the ones previously described. This type of conduit has the advantage that it reduces the head loss in the conduit and increases the quality of liquid used for the unclogging operation whilst retaining excellent protection against the risk of unpriming.

Figure 11:
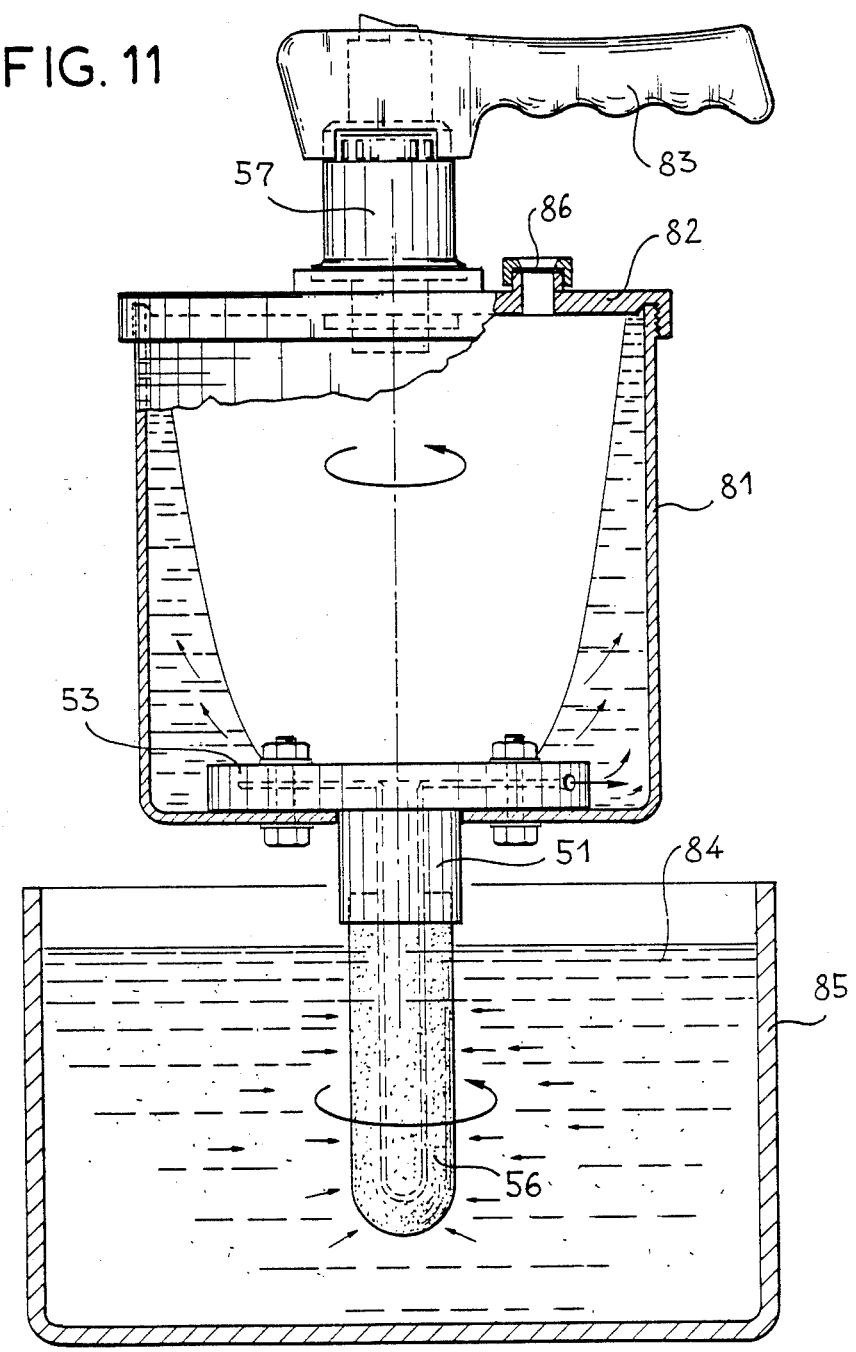
FIG. 11 shows in elevation and partial cross-section a fifth embodiment of the device shown in FIG. 1.

FIG. 11 shows another embodiment of the device in accordance with the invention, of the type shown in FIG. 8, components similar or identical to their counterparts in FIG. 8 having the same reference numbers.

The device shown in FIG. 11 additionally comprises a container 81 fastened to the lower part of the plate 53 containing the spiral conduit. The container a removable cover 82 to which is fixed the motor-brake unit 57, which may be equipped with a battery. A handle 83 is attached to the motor 57 so that the entire filter device may be picked up with one hand in order to immerse the membrane 56 into a solution 84 to be filtered in a container 85, for example. A porous membrane 86 which is fluid-tight relative to the liquid of the suspension but allows air to pass through it is fastened to the cover 82.

Filtration is effected by rotating the filter membrane 56 fastened to the conduit and the container 81 by operating the motor 57, the membrane 86 fastened to the cover allowing air to leave the container 81 as it fills with filtered liquid but preventing any leakage of liquid.

If the filter membrane 56 should become clogged then the rotation of the motor 57 is naturally stopped suddenly, as already explained.

This embodiment of the device in accordance with the invention makes it possible to avoid pollution of the filtered liquid, which is collected in a closed container which is fluid-tight relative to the liquid concerned.

The device in accordance with the invention may be used to filter out from liquid solutions particles in the form of, for example, mineral substances, bacteria, colloids, grains of silica or micro-droplets of a liquid phase that is not miscible with the liquid phase of the suspension.

The device in accordance with the invention provides for unclogging by momentarily reversing the flow of filtered liquid. The unclogging system does not comprise any material obstacle such as a valve on the flowpath of the filtered liquid.

The filter device in accordance with the invention may be used with all types of porous membrane filter units. It is of course possible to associate with a single rotary conduit unclogging system either one single or a number of identical filter units connected in parallel. The filter device in accordance with the invention is particularly advantageous when the membrane(s) of the filter unit is/are of ceramic, since this material offers unusually high resistance to high pressure in the liquid and to erosion.

There is claimed:

1. Method for filtering a suspension of particles in a liquid, the method comprising:

the liquid of the suspension disposed on a first side of a porous membrane is passed continuously through the membrane so as to obtain a flow of filtered liquid on the second side of the membrane, particles from the suspension then collecting in an undesirable manner on the first side of the membrane and clogging its pores, and the filtered liquid is caused to flow at least once and momentarily towards the membrane in the opposite direction to the aforementioned flow so as to return to the suspension the particles collected on the first side of the membrane during the aforementioned passage of the liquid therethrough, and in which method the temporary return flow of the liquid is obtained:

by feeding the flow of filtered liquid into one end of a conduit which is wound around an axis and recovering the filtered liquid at the other end of the conduit, said one end of said conduit being in fluid communication with the second side of said membrane, by progressively rotating the conduit about the axis in the direction opposite to the direction of flow of the filtered liquid relative to the conduit until the rotation speed of the conduit attains a predetermined constant value greater than the speed of the filtered liquid relative to the conduit, and by suddenly stopping rotation of the conduit.

2. Device for filtering a suspension of particles in a liquid, comprising:

a porous membrane the pores of which are adapted to hold back the particles, the suspension being disposed on and in contact with a first side of the membrane, means for passing the liquid of the suspension through the membrane from the first side to the second side so as to obtain a flow of filtered liquid on the second side of the membrane, particles then collecting in an undesirable manner on the first side of the membrane and clogging its pores, means for exerting on the second side of the membrane a momentary pressure such as to cause the filtered liquid to flow in the opposite direction to the aforementioned flow so as to return to the suspension the particles collected on the first side of the membrane, a conduit wound around an axis, means for placing a first end of said conduit in fluid communication with said second side of said membrane for feeding the flow of filtered liquid into said first end of the conduit situated near the axis so as to cause the liquid to flow relative to the conduit towards its second end in one direction about the axis, means for progressively rotating the conduit about the axis in the direction opposite to that of the relative flow until the speed of rotation reaches a predetermined constant value greater that the speed of the relative flow, and means for suddenly stopping rotation of the conduit.

3. Device according to claim 2, wherein the conduit is in the shape of a spiral substantially disposed on a plane circular surface perpendicular to and centered on the axis.

4. Device according to claim 3, wherein the inner end of the spiral is situated in the vicinity of the centre of the circular surface to form the second end of the conduit and the outer end of the spiral is brought back towards the axis to constitute the first end of the conduit.

5. Device according to claim 3, wherein the second end of the conduit is situated at the perimeter of the circular surface so as to provide for ejection of the filtered liquid from this second end during rotation of the conduit, the means for passing the liquid of the suspension through the membrane utilizing the suction force generated by this ejection.

6. Device according to claim 5, wherein the conduit comprises in the vicinity of its second end a portion along which the minimum distance from this portion to the axis decreases on approaching the second end, the decrease in this distance over the entire length of this portion being greater than the inside transverse dimension of the portion of the conduit as measured along a radius of the spiral.

7. Device according to claim 5, wherein:

the membrane is in the shape of a cylindrical tubular body of revolution closed at a first end, said membrane being fixed to said conduit by the second end of said tube, the axis of which is vertical and coincident with the axis of rotation of the conduit, the device further comprises:

a tubular macroporous body having an outside surface placed against the inside surface of the membrane, and a cylindrical core fastened to the conduit and disposed along the axis inside the macroporous tubular body so as to leave between the surface of the core and the inside surface of the macroporous body a tubular capillary space communicating with the first end of the conduit, the outside surface of the membrane constituting the first side thereof in contact with the suspension, the conduit is a capillary conduit at least at its two ends, and the means for passing the liquid of the suspension from the first side to the second side of the membrane utilize the capillary forces in the pores of the membrane, in the macroporous body and in the capillary tubular space.

8. Device according to claim 7, wherein the conduit is a capillary conduit over all of its length.

9. Device according to claim 7, wherein the conduit comprises between two capillary end parts a middle part whose inside transverse dimension is sufficiently large for the capillary forces in the liquid to be negligible there, a capillary first end part of the conduit bringing the outer end of the spiral back towards the axis so as to form the first end of the conduit and the capillary second end part of the conduit bringing the inner end of the spiral towards the perimeter of the circular surface so as to form the second end of the conduit.

10. Device acrding to claim 7, further comprising a container surrounding and fixed to the conduit, the upper part of the container wall being fitted with a porous membrane which is fluid-tight relative to the liquid of the suspension but permeable to air, the container comprising openings to enable the filtered liquid to be collected.

11. Device according to claim 5, further comprising a fixed container surrounding the conduit, filled with filtered liquid and comprising an opening in its upper part to enable the filtered liquid to be collected.

12. Device according to claim 2, wherein the conduit is in the shape of a helix disposed on a cylindrical surface of revolution around the axis, the two ends of the helix being brought back towards the axis to form the first and second ends of the conduit.

* * * * *